(12) United States Patent
Hewitt

(10) Patent No.: US 11,805,743 B2
(45) Date of Patent: Nov. 7, 2023

(54) TRELLIS POSTS

(71) Applicant: FSP Holdings Pty Ltd, Singleton (AU)

(72) Inventor: Stephan Hewitt, Singleton (AU)

(73) Assignee: FSP Holdings Pty Ltd, Singleton (AU)

( * ) Notice: Subject to any disclaimer, the term of this patent is extended or adjusted under 35 U.S.C. 154(b) by 160 days.

(21) Appl. No.: 17/155,263

(22) Filed: Jan. 22, 2021

(65) Prior Publication Data

US 2021/0161081 A1 Jun. 3, 2021

Related U.S. Application Data

(63) Continuation-in-part of application No. PCT/AU2019/050766, filed on Jul. 23, 2019.

(30) Foreign Application Priority Data

Jul. 23, 2018 (AU) .................................. 2018902652

(51) Int. Cl.
*A01G 9/12* (2006.01)
*A01G 17/06* (2006.01)
*E04H 17/08* (2006.01)
*E04H 17/12* (2006.01)

(52) U.S. Cl.
CPC ............ *A01G 9/122* (2013.01); *A01G 17/06* (2013.01); *E04H 17/08* (2013.01); *E04H 17/12* (2013.01)

(58) Field of Classification Search
CPC ........ A01G 9/122; A01G 17/06; E04H 17/08; E04H 17/12; E04H 17/006
USPC ............................................................ 47/47
See application file for complete search history.

(56) References Cited

U.S. PATENT DOCUMENTS

| | | | | |
|---|---|---|---|---|
| 1,529,315 A | * | 3/1925 | Lewis | A01G 9/122 47/55 |
| 1,976,264 A | * | 10/1934 | Miner | G01C 15/06 52/165 |
| 1,983,956 A | * | 12/1934 | Wakefield | A01G 17/06 47/47 |
| 4,175,883 A | | 11/1979 | Lemelson | |
| 4,218,415 A | * | 8/1980 | Biscaro | B29C 44/5654 249/97 |
| 5,349,780 A | * | 9/1994 | Dyke | A01G 9/122 248/188.5 |
| 5,630,292 A | * | 5/1997 | Heinz | A01G 17/06 47/46 |

(Continued)

FOREIGN PATENT DOCUMENTS

| WO | 0104440 A1 | 1/2001 | | |
|---|---|---|---|---|
| WO | WO-2017142426 A1 | * | 8/2017 | ............ A01K 3/00 |

*Primary Examiner* — Brady W Frazier
*Assistant Examiner* — Zoe Tam Tran
(74) *Attorney, Agent, or Firm* — The Webb Law Firm

(57) ABSTRACT

A trellis post comprises a moulded plastic tubular element defining a central post, the central post providing an interior and defining two flanges extending from opposed sides of the central post. The flanges extend along the length of the tubular element and define a series of spaced apart slots for receiving wires. The trellis post defines a ground engaging spike at one end. The moulded plastic tubular element is reinforced with an internal stake extending through the interior of the post and a supporting/filling material is located between the stake and the interior of the central post. The filling material may be a foamed plastics material, mortar, concrete, and Portland cement.

12 Claims, 8 Drawing Sheets

(56) References Cited

U.S. PATENT DOCUMENTS

| | | | |
|---|---|---|---|
| 7,168,220 B2 * | 1/2007 | Owoc | B29C 63/18 |
| | | | 52/844 |
| 2008/0190019 A1 | 8/2008 | Hart | |
| 2011/0056128 A1 * | 3/2011 | King | A01G 29/00 |
| | | | 47/48.5 |
| 2012/0000124 A1 * | 1/2012 | Posa | A01G 9/12 |
| | | | 47/45 |

* cited by examiner

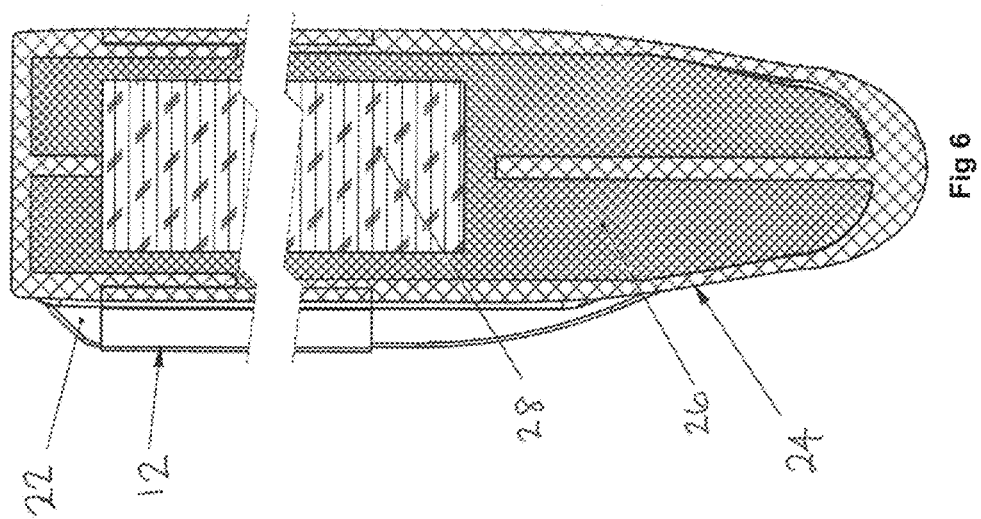
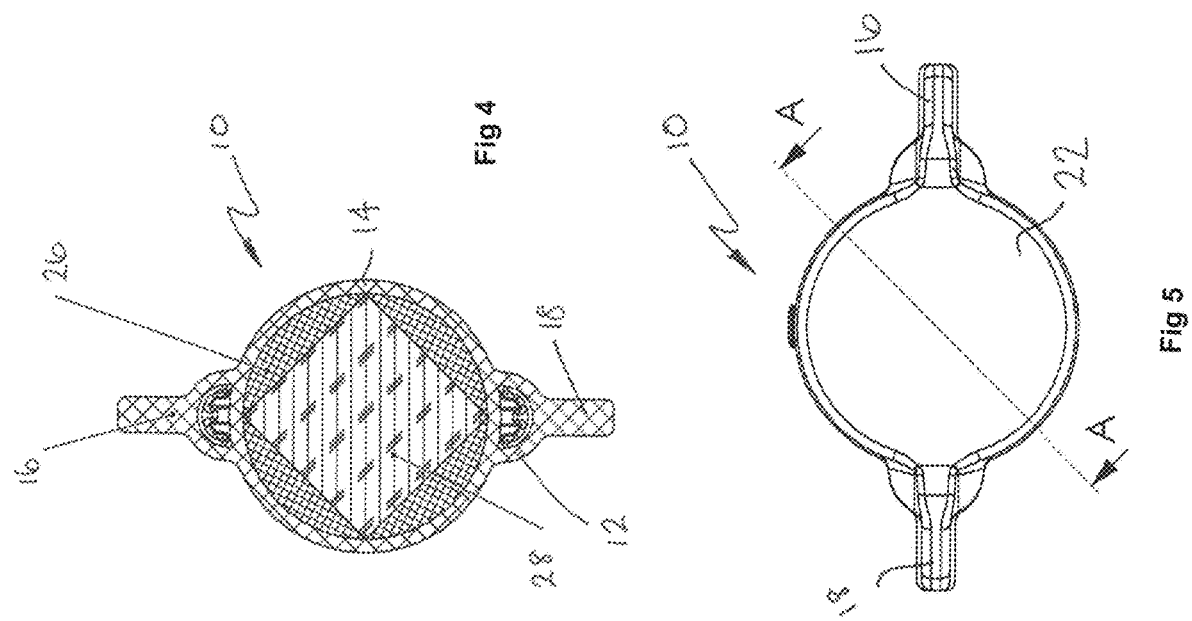

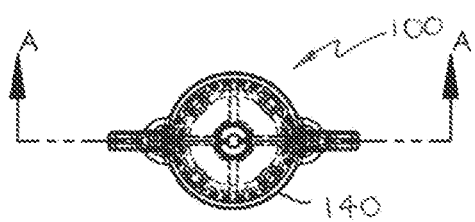
Fig 11
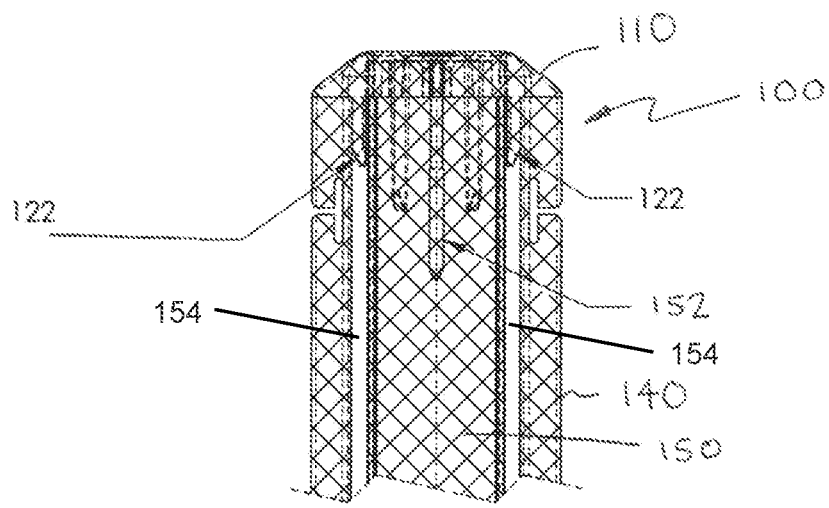
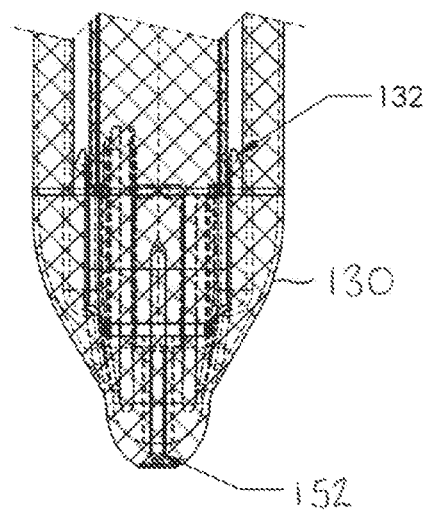
Fig 12

TRELLIS POSTS

CROSS REFERENCE TO RELATED APPLICATIONS

This application is a continuation-in-part of International patent application No PCT/AU2019/050766, filed on 23 Jul. 2019, published as WO 2020/019021, and entitled "Improvements in Trellis Posts" which in turn claims priority from Australian provisional patent application no 2018902652 filed 23 Jul. 2018, the entire contents of all of which are herein incorporated by reference.

TECHNICAL FIELD

This invention relates to improvements in posts, particularly trellis posts.

BACKGROUND OF THE INVENTION

Trellis posts are commonly used in vineyards for carrying wires on which vines are trained. Vineyards can be harvested by hand or by machine. Where machine harvesting is carried out the trellis need to be resilient to being struck by machinery.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY OF THE INVENTION

According to a first aspect of the present invention there is provided a trellis post comprising a moulded plastic tubular element defining a central post, the central post providing an interior and defining two flanges extending from opposed sides of the central post, the flanges extending along the length of the tubular element, the flanges defining a series of spaced apart slots for receiving wires and wherein the trellis post defines a ground engaging means at one end; and wherein the moulded plastic tubular element is reinforced with an internal stake extending through the interior of the post and a supporting/filling material is located between the stake and the interior of the central post, wherein the supporting material is selected from the group consisting of a foamed plastics material, mortar, concrete, and Portland cement.

Typically the moulded exterior of the post is made from PVC.

It is preferred that the stake is wooden, and is typically pine.

The foamed plastics material is preferably foamed polyurethane.

Typically the ground engaging means is a spike. The spike may be moulded from any suitable material and the preferred materials include HPDE, polycarbonate, Nylon and polypropylene, with HPDE being the most preferred material.

The moulded plastic tubular element is preferably made by extrusion.

The spaced apart slots typically extend downwardly at an angle from an open end towards the centre of the post when the post is vertically oriented in use.

The invention also encompasses a method of making a trellis post comprising the steps of;
forming a moulded plastic tubular element comprising a central post defining an interior and two flanges extending from opposed sides of the central post, the flanges defining a series of spaced apart slots for receiving wires;
pouring a foamed plastics material, concrete, mortar or portland cement mix into the central post; and
inserting a reinforcing stake into the interior.

In a related aspect, the invention also encompasses a method of making a trellis post comprising the steps of;
forming a moulded plastic tubular element comprising a central post defining an interior and having open ends and defining two flanges extending from opposed sides of the central post, the flanges defining a series of spaced apart slots for receiving wires;
inserting a reinforcing stake, typically made of wood, into the interior of the tubular element;
closing the ends of the tubular element with a cap on one end and a ground engaging spike on the opposite end, the spike and cap defining one or more protrusions for engaging with the tubular element, at least some of the protrusions being tubular and allowing for the injection of foamed material therethrough;
pouring a foamed plastics material, or optionally concrete, mortar or portland cement mix, into the central post through the tubular protrusions to fill the interior of the post.

Typically the reinforcing stake is secured to the cap and to the spike using fasteners prior to filling of the interior of the post.

The invention also provides a post made according to the above method.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Specific embodiments of the present invention will now be described, by way of example only, and with reference to the accompanying drawings in which:

FIG. 4 shows a section through the post of FIG. 1;
FIG. 5 is a top view of the post;
FIG. 6 is a section on A-A of FIG. 5;
FIG. 11 is a sectional view through the second embodiment of the trellis post;
and
FIG. 12 is a section on A-A of FIG. 11.

DETAILED DESCRIPTION OF THE INVENTION

Figure 1:
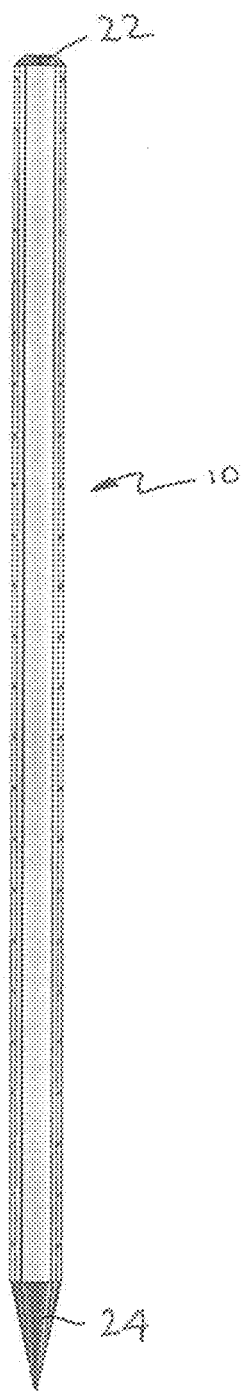
FIG. 1 is a front view of a post embodying the present invention.
Figure 2:
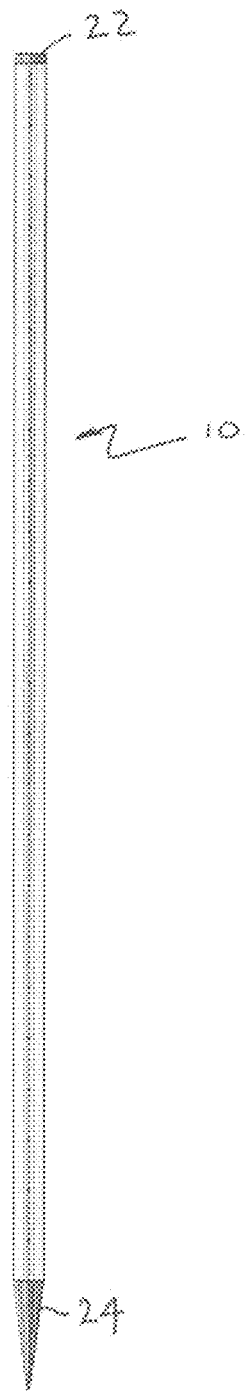
FIG. 2 is a side view of the post of FIG. 1.
Figure 3:
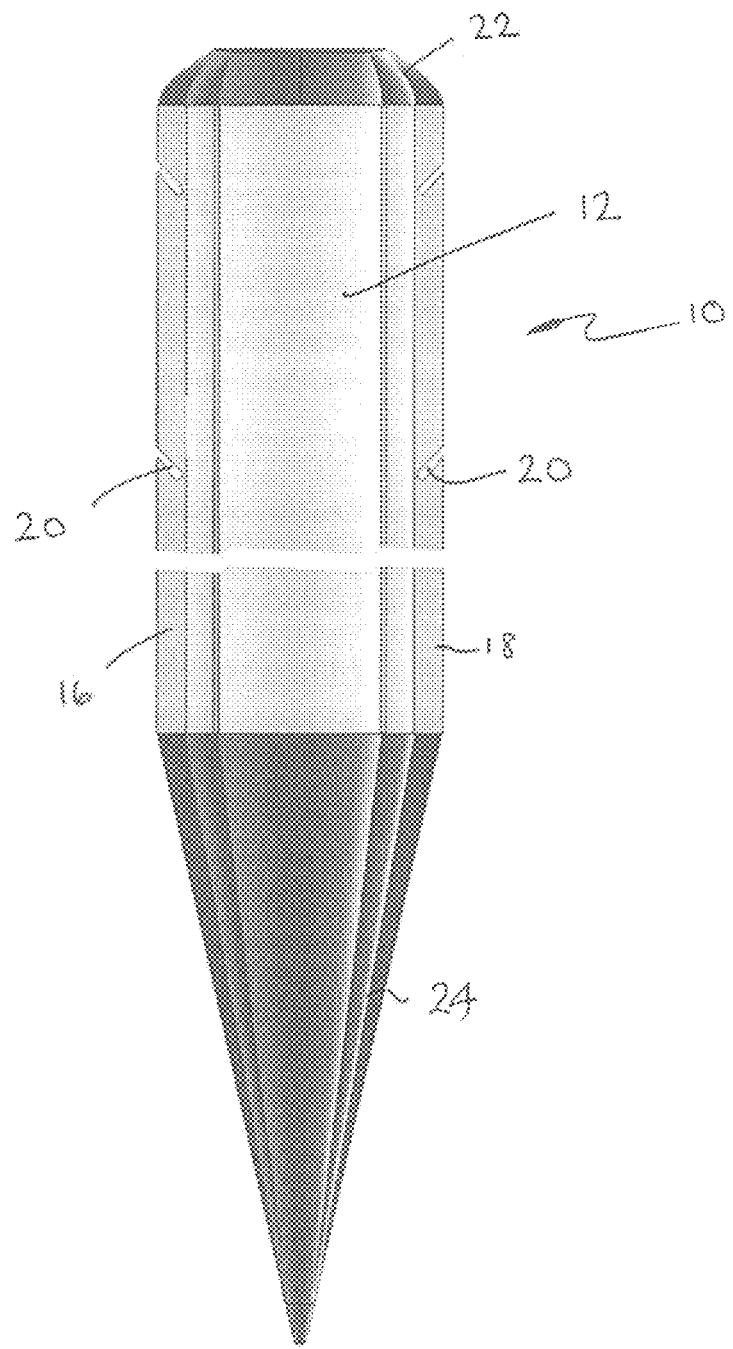
FIG. 3 is an enlarged front view of the ends of the post.

Referring to the drawings, FIGS. 1 to 3 show a trellis post 10. The trellis post comprises a tubular element in the form of a moulded (extruded) plastic tube 12 which defines a central hollow post member 14 from which two flanges 16 and 18 project on opposed sides. The flanges and post member are integrally moulded, most preferably from PVC, although other thermoplastic materials such as HPDE or PP or PET could be used. As is best seen in FIG. 3, a series of slots 20 are defined in the flanges, typically spaced about 100 mm apart for receiving wires for trellising vines and the like. As shown in FIG. 3, the spaced apart slots extend downwardly at an angle from an open end of the slot towards the centre of the post when the post is vertically oriented in use, however the shape of the slots is not critical and may be varied from that shown.

As is also best seen in FIG. 3, the top of the extrusion is closed with a cap 22, which may be made of any suitable plastics material. A ground penetrating spike 24 is attached to the base of the extrusion. The spike 24 is also typically made from a moulded plastics material such as HPDE although it could also be made from other materials, including metals.

With reference to FIG. 4, it can be seen that the PVC extrusion is reinforced with a foamed plastics filling 26—most preferably foamed polyurethane, and a square timber/wooden stake 28, most typically made from pine. As shown in FIG. 6, it can be seen that the opposed corners of the post are aligned with the flanges 16, 18.

The use of the polyurethane foamed filling and strengthening timber stake results in the trellis being stronger and more resistant to bending while still allowing some flexing of the post without damage. In particular the stake increases the stiffness of the post, which is advantageous when the wires carried by the post are loaded with fully grown vines. The stake also assists in maintaining the rigidity of the post when the post is first driven into ground.

In order to manufacture the trellis post, the PVC extrusion 12 is first extruded and cut to size. Next one end of the extrusion is closed, typically with the spike 24, but alternatively with the cap. An amount of foamed polyurethane 26 is then poured into the extrusion and the timber stake 28 is then inserted into the extrusion and the PVC foam is allowed to set. The foamed polyurethane acts as a filler between the stake and the extrusion. The polyurethane foam is made by mixing a 2-part iso/polyol combination and inserting it under relatively low pressure into the post. A dedicated "foaming" or foam injection machine is used for the process. The extrusion is then closed with the cap 22.

Alternatively, instead of the filler being a foamed polyurethane, mortar, concrete, Portland cement, or other similar material may be used which acts to fill the gap between that stake and the post and further stiffens and strengthens the trellis post.

FIGS. 7 to 12 illustrate a variant of the trellis post and method shown in FIGS. 1 to 6.

Figure 7:
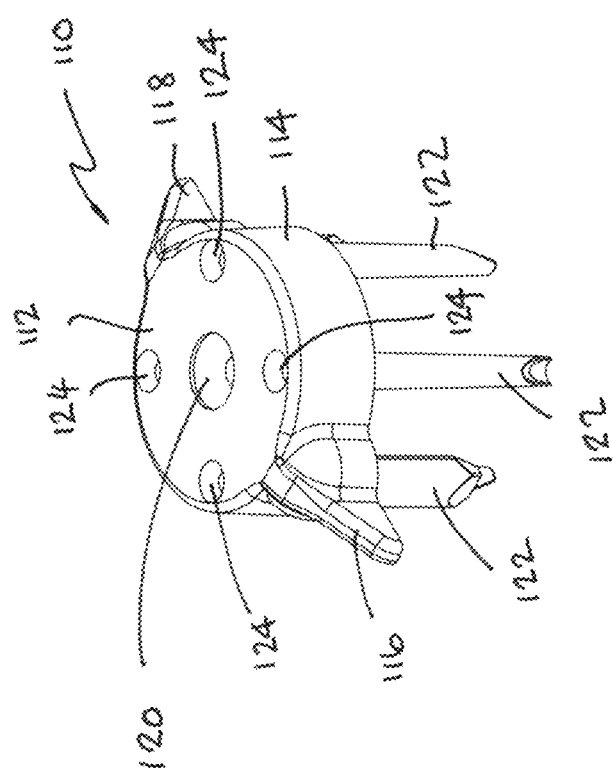
FIG. 7 is an isometric view of an alternative top cap for the trellis post.
Figure 8:
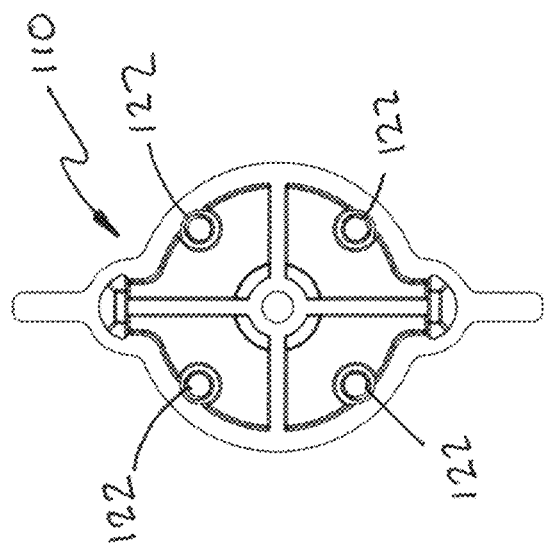
FIG. 8 is a bottom view of the alternative top cap shown in FIG. 7.

FIGS. 7 and 8 illustrate a cap 110 which has a circular top 112 and a depending skirt portion 114 from which two opposed flanges 116 and 118 extend. In the centre of the cap there is a countersunk aperture 120 for receiving a fastener, such as a coach screw. Four tubular tabs/protrusions 122 whose top ends 124 are open to the top 112 of the cap, depend down from the top of the cap.

Figure 9:
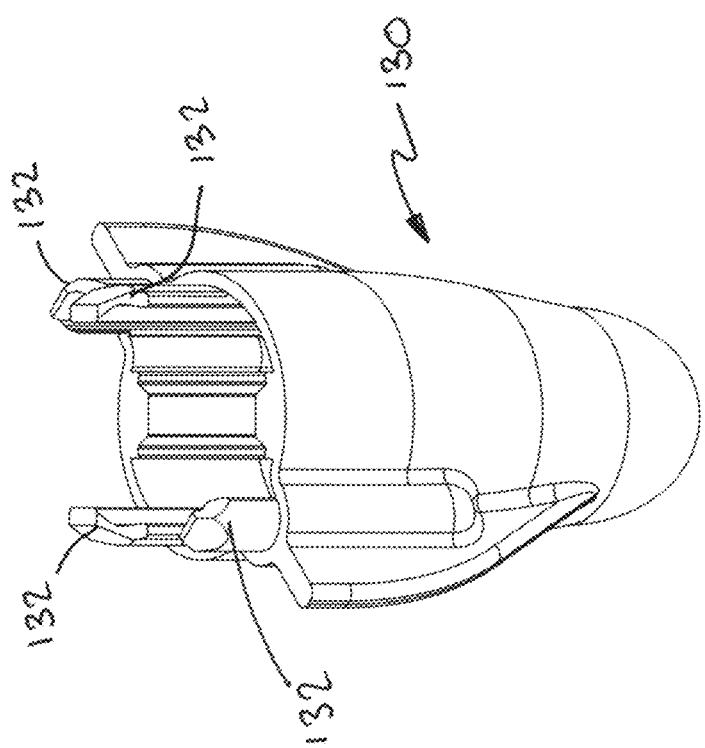
FIG. 9 is an isometric view of an alternative bottom end of the trellis post.
Figure 10:
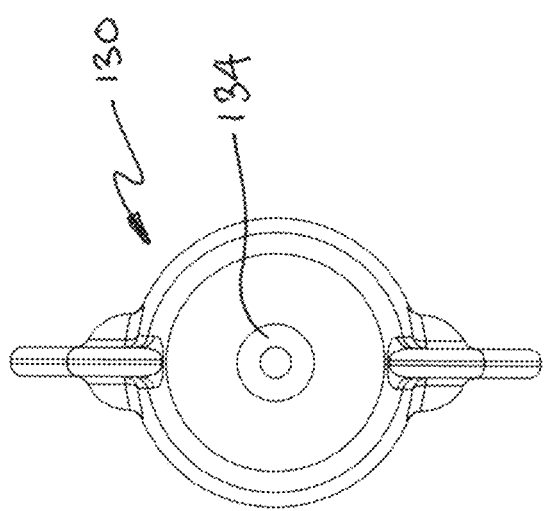
FIG. 10 is a bottom view of the alternative bottom end shown in FIG. 9.

FIGS. 9 and 10 illustrate a variant of the spike 130. The spike defines four protrusions or tabs 132 which engage with the extruded body of the post. As is best seen in FIG. 10, the base of the spike defines a countersunk aperture 134 in its centre for receiving a fastener, such as a coach screw.

FIGS. 11 and 12 show the manufactured and completed trellis post 100. In order to manufacture the trellis post 100, a PVC extrusion 140 substantially identical to the extrusion 12 is first extruded and cut to size. Next one end of the extrusion is closed with the spike 130, but alternatively could be closed with the cap 110. A square timber/wooden stake 150, most typically made from pine, is inserted into the extrusion and enclosed within the extrusion by attaching the cap or spike. A fastener, such as a coach screw 152 is driven into each end of the timber stake 150 through the respective apertures 120, 134. An amount of foamed polyurethane 154 is them injected into the extrusion via the tubular protrusions 122 in the top of the cap and the PVC foam is allowed to set. The tubular protrusions are designed to distribute the urethane foam evenly down and around the timber stake and fill the extrusion.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A trellis post comprising:
   a moulded plastic tubular element defining a central post, the central post providing an interior and defining two integrally moulded flanges extending from opposed sides of the central post, the flanges extending along substantially a full length of the tubular element, the flanges defining a series of spaced apart slots for receiving wires,
   wherein the trellis post defines a ground engaging means at one end of the moulded plastic tubular element and a cap closing an opposite end of the moulded plastic tubular element,
   wherein the moulded plastic tubular element is reinforced with an internal wooden stake extending through the interior of the post, the stake being entirely located within the interior of the tubular element and wherein a supporting/filling material is located between the stake and the interior of the central post, and
   wherein the supporting material is selected from the group consisting of a foamed plastics material, mortar, concrete, and Portland cement.

2. The trellis post of claim 1, wherein the moulded exterior of the post is made from PVC.

3. The trellis post of claim 1, wherein the foamed plastic material is foamed polyurethane.

4. The trellis post of claim 1, wherein the ground engaging means is a spike and wherein the spike is moulded from the same material as the post.

5. The trellis post of claim 1, wherein the moulded plastic tubular element is formed by extrusion.

6. A method of making a trellis post comprising:
   forming a moulded plastic tubular element comprising a central post defining an interior and having open ends and defining two flanges extending from opposed sides of the central post, the flanges defining a series of spaced apart slots for receiving wires;
   inserting a reinforcing stake into the interior of the tubular element, the stake being entirely located within the interior of the tubular element;
   providing a cap and a ground engaging spike for closing the ends of the tubular element, and closing the ends with the cap on one end and the ground engaging spike on the opposite end, the cap defining one or more protrusions for engaging with the tubular element, at least one of the protrusions being tubular and allowing for the injection of foamed material therethrough; and pouring a foamed plastics material, concrete, mortar or Portland cement mix, into the central post through the tubular protrusions to fill spaces in the interior of the post, the stake being surrounded by the filler.

7. The method of claim 6, further comprising securing the reinforcing stake to the cap and to the spike using fasteners prior to filling of the interior of the post.

8. The method of claim 6, wherein the step of forming the moulded plastic tubular element includes extruding the tubular element and cutting it to size.

9. The method of claim 6, wherein the reinforcing stake is wooden.

10. The trellis post of claim 1, wherein the cap has a top defining a central aperture for receiving a fastener and defines a series of depending tubular protrusions having an open upper end for injection of filling material into the post.

11. The trellis post of claim 1, wherein the spike has a tip defining a central aperture for receiving a fastener and defines a series of protrusions or tabs for engagement with the central post.

12. The trellis post of claim 1, wherein the wooden stake is pine.

\* \* \* \* \*